3,509,435
MECHANICALLY CROSS-COUPLED DUAL CHANNEL ACTUATOR SYSTEM
David Alan Howells, Reading, England, assignor to Sperry Rand Limited, London, England, a company of Great Britain
Filed Nov. 16, 1967, Ser. No. 683,496
Claims priority, application Great Britain, Nov. 17, 1966, 51,574/66
Int. Cl. G05b 13/02
U.S. Cl. 318—18　　　　　　　　　　　9 Claims

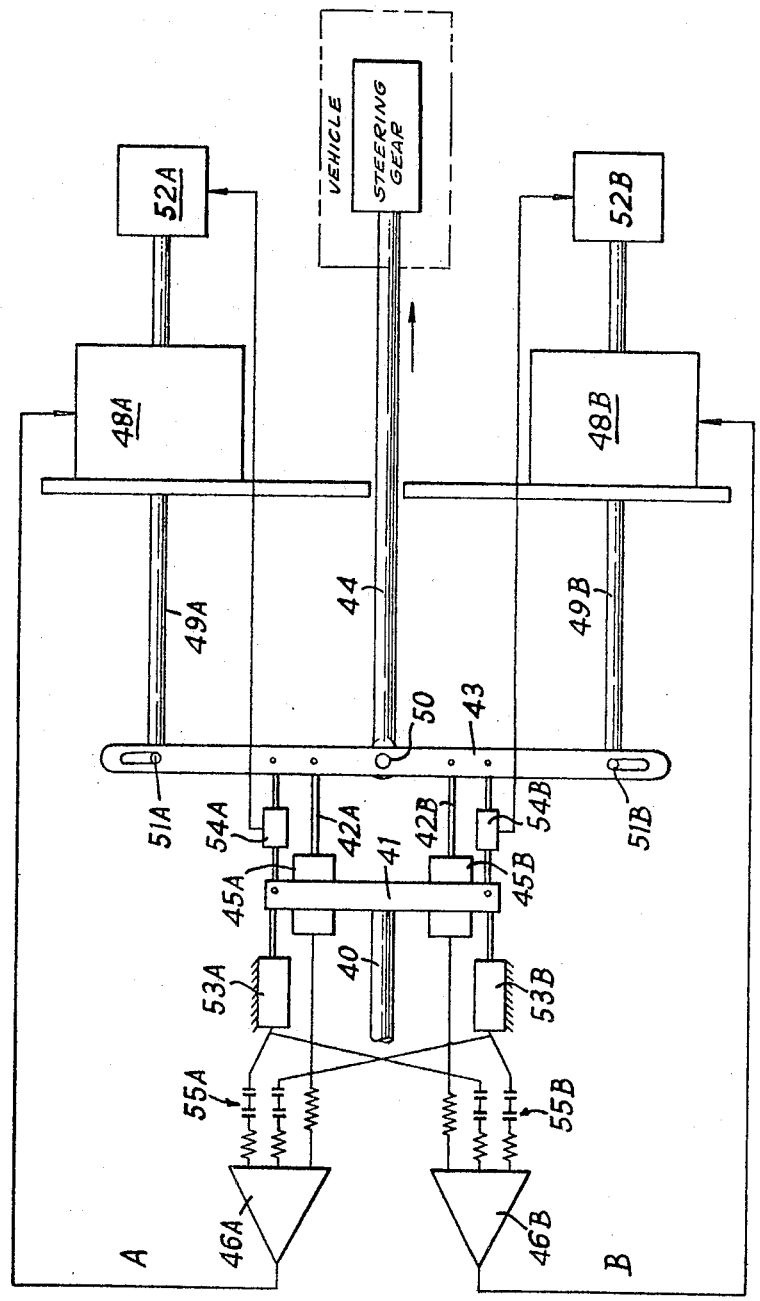

ABSTRACT OF THE DISCLOSURE

An actuation system for controlling the steering of an omnibus or coach has a follow-up arm which imparts mechanical movement to an input shaft which is secured to a rectangular framework. Opposite links of the framework are compressible, the compression being sensed by pick-offs which operate jacks through amplifiers. The jacks in turn move the framework so as to return the compressible links to their original length. The movement of the jacks also operates the steering gear of the omnibus.

CROSS REFERENCES

U.S. Ser. No. 520,762 applied for on Jan. 14, 1966, in the names of J. E. Bourne and J. A. Simpson (assignors to the present applicants) shows an actuation system intended for an aircraft control system. This arrangement has a large number of electrical components such as would create maintenance difficulties in an omnibus or coach garage.

This invention relates to actuator systems by which a source of control signals is linked to operate a member that is to be controlled. In particular, but not exclusively, it relates to systems in dirigible craft in which an operator may be required to position controls manually but in which an automatic control may at times either adjust or replace the efforts of the operator. In known systems the automatic control signals are fed to the actuator system, and to ensure that the apparatus is fail-safe the actuator system comprises either two or three actuator channels arranged in parallel. Two actuator channels in parallel are said to constitute a duplex actuation system, while three are said to constitute a triplex system. With a triplex system, should one of the three actuator channels fail, it will be overcome by the other two and automatic control may continue until a second actuator channel fails, when the automatic control system must be disengaged and the operator has to take over fully manual control. With a duplex system any disparity between the operation of the two actuator channels is normally noted by a comparator, and is taken to indicate that at least one of these channels must be faulty. The automatic control system is then at once disconnected and the operator has to take over fully manual control.

This invention provides an actuator system including two actuator channels in parallel linked to operate a common controlled member, each actuator being connected in a respective one of two channels, each channel having means for producing a mechanical feedback signal which is a function of the actuator setting and means for applying an automatic command signal to vary the setting of the actuator, each said automatic command signal being derived by a mechanical summing device connected to sum a mechanical control signal, the said mechanical feedback signal of the respective channel and the mechanical feedback signal of the other channel.

In one use the actuator system described above is used to actuate the steering gear of land vehicles, the control signal being related to the deviation of the vehicle from a desired path.

One embodiment of actuator system according to the invention used for land vehicles is shown the figure of the drawing, which figure comprises a schematic circuit drawing.

The embodiment shown in the figure is part of an actuation system for controlling the steering of a land vehicle, e.g. an omnibus. The control signal in this case is a mechanical axial movement of an input shaft 40, obtained from a follower arm (not shown) which in turn derives its movement from a follower which engages a stationary guide means. The guide means may for instance be a slot along a roadway, the follower engaging in the slot, or a rail over which the follower engages. When the vehicle deviates from a datum position relative to the guide means, the follower arm is rotated relative to the follower, and the rotation is translated into the said axial movement of input shaft 40. The extent and direction of the movement of input shaft 40 are therefore related to the amount and direction of the deviation and so together constitute said control signal.

Shaft 40 is secured to a rectangular framework made up of links 41, 42A, 42B and 43, all the connections being pivot points. Opposite links 42A and B are compressible and extendable so that as shaft 40 moves, link 41 either pushes or pulls to tend to alter the lengths of the extendable links. Each extendable link is connected in one of two similar mechanical/electrical actuator channels A and B, channel A comprising the upper half of the figure and channel B of the lower, and similar parts in the two channels are henceforth referred to by the same reference numeral with the suffix A or B to indicate the relevant channel.

Associated with extendable links 42A, 42B are linear inductive pick-offs 45A, 45B respectively, which sense changes in length of the connections from a common datum length and feed electrical signals representing the amount and sense of the change through resistors to summing amplifiers 46A, 46B. The output signals from the amplifiers are applied to operate electrohydraulic jacks 48A, 48B so that levers 49A, 49B are moved axially. Each lever 49A, 49B has a pivoted connection 51A, 51B with one of the two opposite ends of link 43 of the rectangular linkage.

In operation, therefore, the change in length of each of extendable links 42A, 42B results in a movement of the respective end of link 43, the movement being in the sense to reduce the said change in length to zero.

When both actuator channels are working correctly, the same signal is applied to both jacks and the link 43 moves bodily toward or away from link 41 maintaining both links 42A, 42B at their datum lengths. To the centre point 50 of link 43 an output shaft 44 is pivoted so that movement of the link 43 moves the shaft substantially axially. The output shaft 44 mechanically engages the otherwise conventional steering of the vehicle so that the direction of motion of the vehicle is adjusted in the direction to return the vehicle to its datum position relative to the guide means, so reversing the movement of input shaft 40. As the vehicle attains its datum position, therefore, the rectangular linkage is also returned to a datum position and the steering adjustment is removed.

The movements of the output shaft are therefore equal to the movements of the input shaft, but are powered from the hydraulic jacks, so that sufficient power is available to operate the vehicle's steering while only a low resistance to movement of shaft 40 is afforded. Link 43 therefore applies its movement to the output shaft which also acts as a feedback to the rectangular linkage, the feedback affecting both channels, which may therefore be regarded as mechanically cross-coupled for feedback.

The purpose of the two parallel channels A and B is to incorporate "fail safe" properties into the actuator system so that in the event of certain more likely component failures, the vehicle is still steered satisfactorily. This is achieved partly by the inherent qualities of the rectangular linkage, and by including a fault detection means. The electrical components of each channel are powered from separate supplies in order to reduce the likelihood of both channels failing from this cause.

Considering these in order, the rectangular linkage has the output shaft 44 attached at the centre point of link 43. If therefore, for instance, channel A ceases operating, e.g. if the amplifier 46A no longer produces output signals, or the jack 48A ceases to work, or if pick-off 45A ceases to produce output signals, then changes in length of extendable link 42A will not be compensated by movements of the top end of link 43. A consideration of the geometry will show that when a control movement is received, which for instance extends both extendable links 42A and 42B, then if only the lower end of link 43 is adjusted, the lever 43 will pivot about its now stationary upper end and pivot 51A until link 42B is returned to the datum length. This will involve some adjustment in the right direction of the length of link 42A and will also move centre point 50 in the correct direction by an amount which is less than the movement of input shaft 40, but which, due to the relatively long distance between pivot 51A and the centre point 50, and the relatively short distance between the connection of link 42B to link 43 and the centre point 50, is not very much different from that movement. For instance, when the relative dimensions are approximately as shown in the figure, then a loss of about 16 percent of the movement is involved. This means that the loop gain would be reduced by 16 percent which can be shown to have a negligible effect on the performance. In another arrangement the relative dimensions are such that a gain reduction of only 9 percent is experienced.

In one likely type of failure a jack, for instance jack 48A, starts to go hard over in one direction or the other. This can be due to a hydraulic failure or to pick-off 45A failing in a manner producing a continuous maximum output signal. The consequent movement of pivot point 51A causes a change of both the lengths of link 42A and 42B. The other jack therefore starts to work in the opposite direction to return link 42B to the datum length and in doing so opposes the erroneous motion of the centre point 50. Each extendable link 42A, 42B has a threshold switch 54A, 54B (mounted close to the link although shown spaced therefrom for clarity) which senses when the link has exceeded threshold limits of extension and compression, which limits are not reached in normal working. The threshold switches operate brake devices 52A, 52B which brake the respective jack to prevent it going completely hard over, and so maintain the channel inoperative. The brake devices may also operate to return the jack to a centre position and to brake it there. The threshold switches can also operate a warning device informing the driver that one channel is out of order.

In order that the actuators should respond more rapidly to rapidly changing control signals, pick-offs 53A, 53B sense the distance moved by the ends of link 41. The output signals are then passed through differentiating circuits 55A, 55B which in their simplest form comprise one or more capacitors in series with a resistance, and the resulting outputs, which are related to the rates of change of the signals from pick-offs 53A, 53B, are added in the summing amplifiers 46A, 46B to the jack actuating signal.

Electrical cross-coupling between the channels is effected by applying the rate of change signal from channel A to the channel B amplifier and vice versa. This ensures that the total rate components added to the jack actuating signals are the same in both channels. If, for instance, one of pick-offs 53A, 53B fails by producing a continuous maximum output signal, the respective differentiated rate signal will be zero. However, a rate signal will still be obtained by the cross-coupling from the other channel so that the jack actuating signals will still contain a rate term, although this is less than would otherwise be included.

It will be appreciated that the more likely types of component failure will result in the actuator system continuing to work correctly though in some cases with reduced efficiency. Accordingly, following a failure the vehicle can continue under automatic steering, though if desired a warning can operate. The driver may then effect a reduced forward speed, or, in cases where the speed is also automatically controlled, the reduced speed can be automatically commanded.

To extend the fail-safe further the electrical and hydraulic supplies for the two channels can be duplicated.

What is claimed is:

1. An actuator system including two actuator channels in parallel linked to operate a common controlled member, each actuator being connected in a respective one of two channels, each channel having means for producing a mechanical feedback signal which is a function of the actuator setting and means for applying an automatic command signal to vary the setting of the actuator, each said automatic command signal being derived by a mechanical summing device connected to sum a mechanical control signal, the said mechanical feedback signal of the one channel and the said mechanical feedback signal of the other channel, wherein said mechanical summing device comprises a pivotally connected rectangular linkage including a first link having applied thereto said mechanical control signal, a second link having applied thereto said feedback signals from the one channel and the other channel, and two extendable links extendable by movements of said first and second links whereby the varying lengths of said extendable links comprise respectively said automatic command signals, and wherein each said means for applying the automatic command signal to vary the setting of the actuator comprises an electrical pick-off arranged to sense the variation from a nominal value of the length of the respective extendable link, the electrical output of the pick-off being amplified and applied to the respective actuator.

2. An actuator system as claimed in claim 1, wherein said mechanical control signal is applied to the centre point of said first link and said second link is extended at each end from the rectangle, said mechanical feedback signals being applied to either end of the extended second link.

3. An actuator system as claimed in claim 1, wherein an output shaft is connected to the centre point of the second link, the output of the system comprising the linear motion of said output shaft.

4. An actuator system as claimed in claim 1, wherein each extendable link has associated therewith a rate device having an electrical output related to the rate of change of length of the link, the rate output being algebraically added to the respective automatic command signal.

5. An actuator system as claimed in claim 4, wherein each rate output is also applied to the automatic command signal of the other channel.

6. An actuator system as claimed in claim 1, wherein each extendable link has associated therewith threshold switch means arranged to operate when the link is extended or compressed beyond its normal operating range, each said switch operating a brake device to stop the operation of the respective actuator.

7. An actuator system as claimed in claim 1, wherein each extendable link has associated therewith threshold switch means arranged to operate when the link is extended or compressed beyond its normal operating range, each switch operating means returning the respective actuator to a central position and braking it there.

8. An actuator system as claimed in claim 3, wherein said output shaft is connected to operate steering gear of a vehicle in which the system is mounted, said control signal relating to the deviation of the vehicle from a desired path.

9. An actuator system including two actuator channels in parallel linked to operate a common controlled member, each actuator being connected in a respective one of two channels, each channel having means for producing a mechanical feedback signal which is a function of the actuator setting and means for applying an automatic command signal to vary the setting of the actuator, each said automatic command signal being derived by a mechanical summing device connected to sum a mechanical control signal, the said mechanical feedback signal of the one channel and the said mechanical feedback signal of the other channel, and wherein said mechanical summing device comprises a pivotally connected rectangular linkage including a first link having applied thereto said mechanical control signal, a second link having applied respectively to the extremities thereof the feedback signals from the one channel and the other channel, and two extendable links pivotally connected respectively at points intermediate said extremities of said second link and extendable by movements of said first and second links whereby the varying lengths of said extendable links comprise respectively said automatic command signals.

References Cited
UNITED STATES PATENTS

| | | | |
|---|---|---|---|
| 3,070,071 | 12/1962 | Cooper | 318—19 XR |
| 3,219,295 | 11/1965 | Hastings | 318—489 XR |
| 3,269,676 | 8/1966 | Hopkins | 318—18 XR |
| 3,379,951 | 4/1968 | Franchi et al. | |

BENJAMIN DOBECK, Primary Examiner

U.S. Cl. X.R.

318—489